US012548934B2

(12) United States Patent
Leme et al.

(10) Patent No.: US 12,548,934 B2
(45) Date of Patent: Feb. 10, 2026

(54) HEADER CONNECTOR HAVING TERMINAL STABILIZER

(71) Applicant: TE CONNECTIVITY BRASIL INDUSTRIA DE ELECTRONICOS LTDA, Braganca Paulista (BR)

(72) Inventors: Rafael Kazuo Sato T. Leme, Sao Paulo (BR); Gustavo Bonucci, Sao Paulo (BR)

(73) Assignee: TE Connectivity Brasil Industria DE Electronicos LTDA (BR)

( * ) Notice: Subject to any disclaimer, the term of this patent is extended or adjusted under 35 U.S.C. 154(b) by 415 days.

(21) Appl. No.: 18/179,491

(22) Filed: Mar. 7, 2023

(65) Prior Publication Data

US 2024/0305031 A1 Sep. 12, 2024

(51) Int. Cl.

| | |
|---|---|
| ***H01R 13/42*** | (2006.01) |
| ***H01R 13/627*** | (2006.01) |
| ***H01R 13/629*** | (2006.01) |
| ***H01R 13/639*** | (2006.01) |

(52) U.S. Cl.

CPC ......... *H01R 13/42* (2013.01); *H01R 13/6271* (2013.01); *H01R 13/629* (2013.01); *H01R 13/639* (2013.01)

(58) Field of Classification Search

CPC ................ H01R 13/42; H01R 13/4364; H01R 13/6271; H01R 13/6275; H01R 13/629; H01R 13/639

See application file for complete search history.

(56) References Cited

U.S. PATENT DOCUMENTS

| | | | | |
|---|---|---|---|---|
| 6,435,895 | B1 * | 8/2002 | Fink | H01R 13/6272 439/352 |
| 6,716,052 | B2 * | 4/2004 | Kane | H01R 13/641 439/352 |
| 6,780,045 | B2 * | 8/2004 | Shuey | H01R 13/641 439/352 |
| 9,825,396 | B2 * | 11/2017 | Besser | H01R 13/4538 |
| 11,881,650 | B2 * | 1/2024 | Sundarakrishnamachari | H01R 13/424 |
| 12,046,858 | B2 * | 7/2024 | Martin | H01R 13/641 |
| 2002/0090849 | A1 * | 7/2002 | Shuey | H01R 13/62911 439/157 |
| 2003/0157825 | A1 * | 8/2003 | Kane | H01R 13/641 439/352 |

(Continued)

*Primary Examiner* — Abdullah A Riyami
*Assistant Examiner* — Thang H Nguyen

(57) ABSTRACT

A header connector includes a terminal holder in a cavity of a housing that includes terminal channels between upper and lower surfaces that hold terminals with male mating ends extending from an upper surface of the terminal holder into the cavity for mating with a plug connector. A terminal stabilizer is received in the cavity coupled to the terminal holder including a stabilizer plate with terminal openings that receive the male mating ends. The terminal stabilizer is movable relative to the terminal holder between an extended position and a retracted position. Locking arms engage the support latches to hold the terminal stabilizer in the extended position and are released from the support latches to move to the retracted position. The stabilizer plate is located proximate to distal ends of the male mating ends in the extended position but is remote from the distal ends in the retracted position.

20 Claims, 14 Drawing Sheets

(56) References Cited

U.S. PATENT DOCUMENTS

| | | | | |
|---|---|---|---|---|
| 2015/0333431 | A1* | 11/2015 | Gerwatowski | H01R 13/44 439/141 |
| 2018/0323538 | A1* | 11/2018 | Narro | H01R 13/62938 |
| 2019/0006782 | A1* | 1/2019 | Vasbinder | H01R 43/18 |
| 2021/0296820 | A1* | 9/2021 | Gruendler | H01R 13/62938 |
| 2022/0216638 | A1* | 7/2022 | Soudy | H01R 4/185 |
| 2022/0384992 | A1* | 12/2022 | Azad | H01R 13/6272 |
| 2023/0268693 | A1* | 8/2023 | Martin | H01R 12/716 439/489 |
| 2023/0268696 | A1* | 8/2023 | Martin | H01R 13/5219 439/188 |
| 2023/0268697 | A1* | 8/2023 | Martin | H01R 13/639 439/188 |

* cited by examiner

HEADER CONNECTOR HAVING TERMINAL STABILIZER

BACKGROUND OF THE INVENTION

The subject matter herein relates generally to electrical connector systems.

Electrical connector systems typically include electrical connectors that are mated together to electrically connect various components within the system. Some known the connector systems include a first connector having mail contacts and a second connector having female contacts that receive the mail contacts during mating of the first connector with the second connector. However, larger connectors having many contacts, are susceptible to damage during mating. For example, the mail contacts may be bent or broken during mating if not properly aligned prior to connection.

A need remains for electrical connectors that protect contacts from damage during mating.

BRIEF DESCRIPTION OF THE INVENTION

In one embodiment, a header connector is provided and includes a housing having a cavity configured to receive a plug connector. The header connector includes a terminal holder in the cavity. The terminal holder includes terminal channels extending between an upper surface and a lower surface. The terminal holder includes support latches. The header connector includes terminals received in the terminal channels and held by the terminal holder. The terminals include male mating ends extending from the upper surface of the terminal holder into the cavity for mating with the plug connector. The header connector includes a terminal stabilizer received in the cavity and coupled to the terminal holder. The terminal stabilizer includes a stabilizer plate and locking arms extending from the stabilizer plate. The stabilizer plate includes terminal openings therethrough that receive the male mating ends of the terminals. The terminal stabilizer is movable within the cavity relative to the terminal holder between an extended position and a retracted position. The locking arms engage the support latches to hold the terminal stabilizer in the extended position. The locking arms are released from the support latches to move the terminal stabilizer to the retracted position. The stabilizer plate is located proximate to distal ends of the male mating ends of the terminals in the extended position. The stabilizer plate is located remote from the distal ends of the male mating ends of the terminals in the retracted position.

In another embodiment, a header connector is provided and includes a housing having a cavity configured to receive a plug connector. The header connector includes a terminal holder in the cavity. The terminal holder includes terminal channels extending between an upper surface and a lower surface. The terminal holder includes support latches. The header connector includes terminals received in the terminal channels and held by the terminal holder. The terminals include male mating ends extending from the upper surface of the terminal holder into the cavity for mating with the plug connector. The header connector includes a terminal stabilizer received in the cavity and coupled to the terminal holder. The terminal stabilizer includes a stabilizer plate, locking arms extending from a bottom of the stabilizer plate, and lifter arms extending from a top of the stabilizer plate. The stabilizer plate includes terminal openings therethrough that receive the male mating ends of the terminals. The terminal stabilizer is movable within the cavity relative to the terminal holder between an extended position and a retracted position. The locking arms engage the support latches to hold the terminal stabilizer in the extended position. The locking arms are released from the support latches to move the terminal stabilizer to the retracted position. The lifter arms configured to engage the plug connector to move the terminal stabilizer from the retracted position to the extended position when the plug connector is removed from the cavity, The stabilizer plate is located proximate to distal ends of the male mating ends of the terminals in the extended position. The stabilizer plate is located remote from the distal ends of the male mating ends of the terminals in the retracted position.

In a further embodiment, an electrical connector system is provided and includes a plug connector having a plug housing holding contacts. The plug connector has a mating end. The contacts have sockets at the mating end. The electrical connector system includes a header connector mated to the plug connector. The header connector includes a housing having a cavity configured to receive the mating end of the plug housing. The header connector includes a terminal holder in the cavity. The terminal holder includes terminal channels extending between an upper surface and a lower surface. The terminal holder includes support latches. The header connector includes terminals received in the terminal channels and held by the terminal holder. The terminals include male mating ends extending from the upper surface of the terminal holder into the cavity for mating with the sockets of the contacts of the plug connector. The header connector includes a terminal stabilizer received in the cavity and coupled to the terminal holder. The terminal stabilizer includes a stabilizer plate and locking arms extending from a bottom of the stabilizer plate. The stabilizer plate includes terminal openings therethrough that receive the male mating ends of the terminals. The terminal stabilizer is movable within the cavity relative to the terminal holder between an extended position and a retracted position. The locking arms engage the support latches to hold the terminal stabilizer in the extended position. The locking arms are released from the support latches to move the terminal stabilizer to the retracted position, The stabilizer plate is located proximate to distal ends of the male mating ends of the terminals in the extended position. The stabilizer plate is located remote from the distal ends of the male mating ends of the terminals in the retracted position.

DETAILED DESCRIPTION OF THE INVENTION

Figure 1:
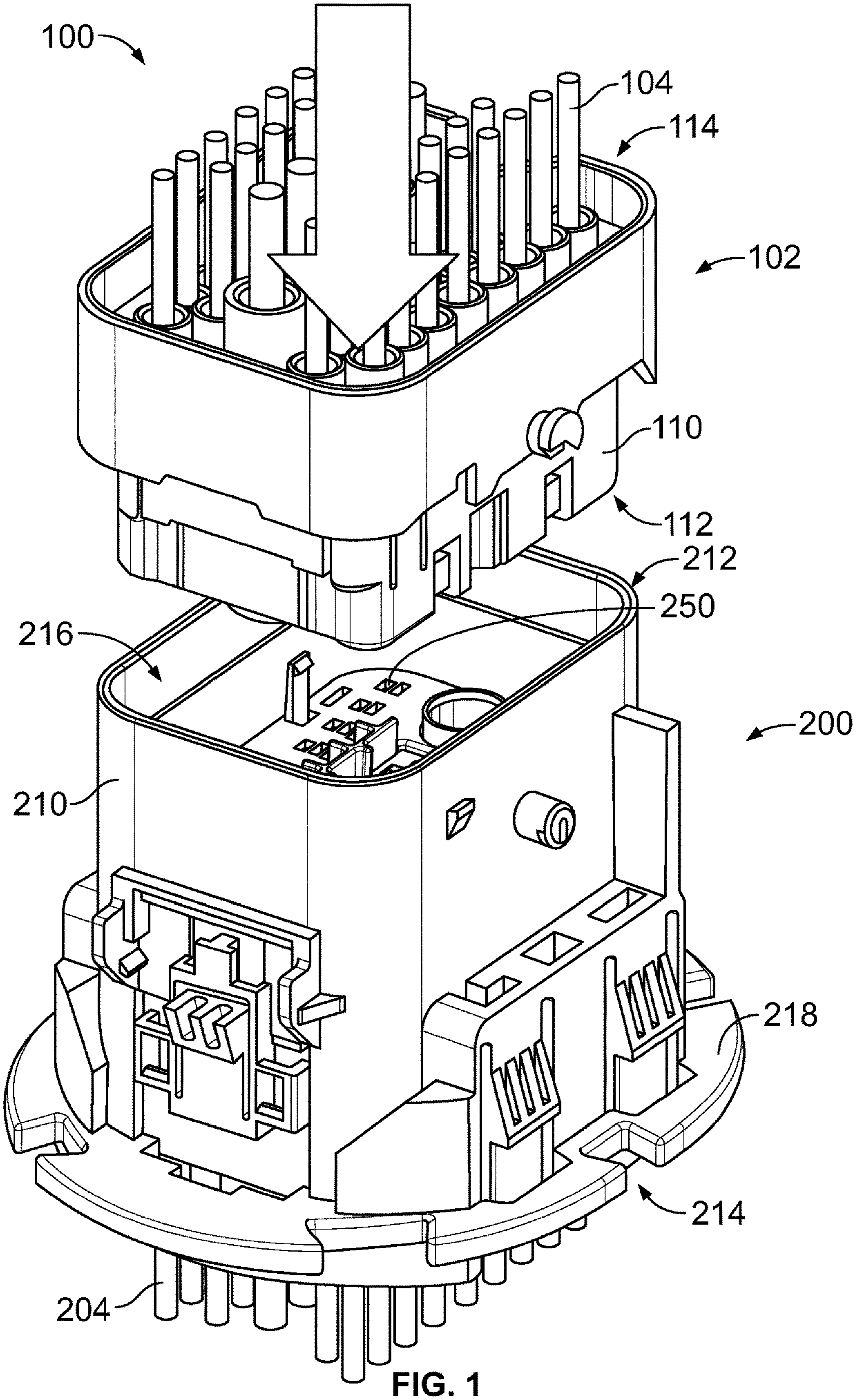
FIG. 1 is an exploded view of an electrical connector system in accordance with an exemplary embodiment.

FIG. 1 is an exploded view of an electrical connector system 100 in accordance with an exemplary embodiment. The electrical connector system 100 includes a plug connector 102 configured to be mated with a header connector 200. In an exemplary embodiment, the plug connector 102 is a cable connector having a plurality of cables 104 extending from the plug connector 102. The cables 104 may be electrically connected to another component within the system. In an exemplary embodiment, the header connector 200 is a cable connector having a plurality of cables 204 extending from the header connector 200. The cables 204 may be electrically connected to another component within the system.

In various embodiments, the electrical connector system 100 may be used in an automotive application, such as to electrically connect various components within a vehicle. However, the electrical connector system 100 may be used in other applications, such as industrial applications, aerospace applications, network systems, appliances, or other electrical systems. In various embodiments, the header connector 200 may be mounted to a structure, such as a chassis, a frame, or other structure. The plug connector 102 is pluggable into the header connector 200. The plug connector 102 may be unmated from the header connector 200.

Figure 2:
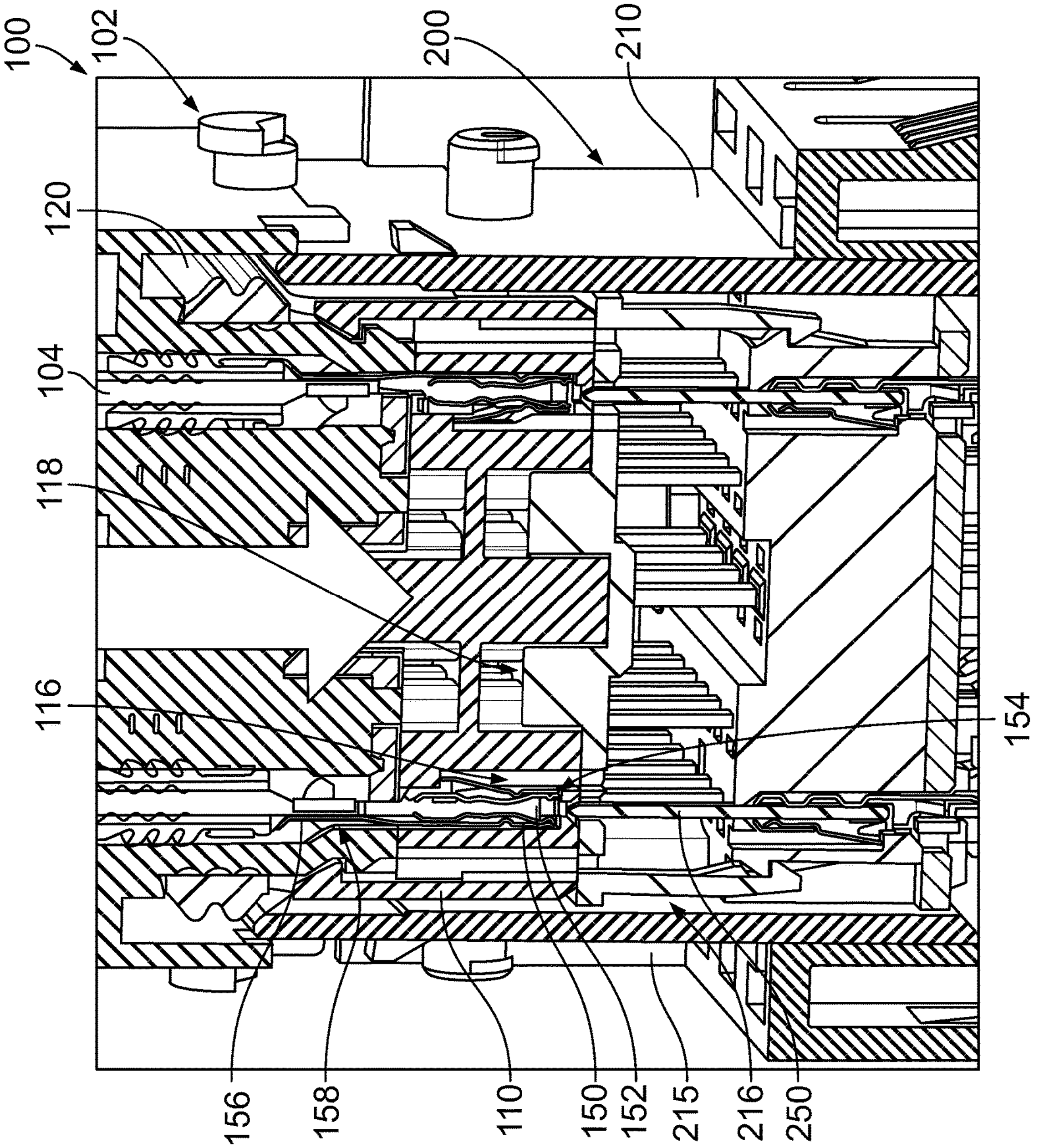
FIG. 2 is a sectional view of a portion of the electrical connector system showing the plug connector partially mated with the header connector in accordance with an exemplary embodiment.

In an exemplary embodiment, the plug connector 102 includes a plug housing 110 holding a plurality of plug contacts 150 (shown in FIG. 2). The plug housing 110 extends between a mating end 112 and a cable end 114. The cables 104 extend from the cable end 114. The mating end 112 is configured to be plugged into the header connector 200. In the illustrated embodiment, the cable end 114 is opposite the mating end 112. However, in alternative embodiments, the cable end 114 may be perpendicular to the mating end 112, such as a right-angle connector. For example, the cables 104 may extend perpendicular to a mating direction. The plug connector 102 may include other components, such as an outer shell surrounding the plug housing 110 and the cables 104. The plug connector 102 may include a lever or other device, such as a latch or clip, to secure the plug connector 102 to the header connector 200.

The header connector 200 includes a housing 210 holding a plurality of terminals 250. The housing 210 extends between a mating end 212 and a cable end 214. The cables 204 extend from the cable end 214. The mating end 212 is configured to be mated with the plug connector 102. For example, the plug connector 102 may be plugged into a cavity 216 of the housing 210 at the mating end 212. In an exemplary embodiment, the housing 210 includes a mounting flange 218 for mounting the header connector 200 to the structure. The mounting flange 218 may be secured to the structure using fasteners, latches, clips, or other securing means. In the illustrated embodiment, the cable end 214 is opposite the mating end 212. However, in alternative embodiments, the cable end 214 may be perpendicular to the mating end 212, such as a right-angle connector. For example, the cables 204 may extend perpendicular to the mating direction.

FIG. 2 is a sectional view of a portion of the electrical connector system 100 showing the plug connector 102 partially mated with the header connector 200. The housing 210 includes an outer wall 215 surrounding the cavity 216. Optionally, the outer wall 215 may surround the cavity 216 on four sides During mating, the plug connector 102 is loaded into the cavity 216 of the housing 210 of the header connector 200. The mating end 112 of the plug housing 110 is plugged into the cavity 216 to mate with the header connector 200. During mating, the plug contacts 150 are mated with the terminals 250.

In an exemplary embodiment, the plug contacts 150 includes sockets 152 at mating ends 154 of the plug contacts 150 the sockets 152 are configured to receive the terminals 250 during mating. In an exemplary embodiment, the plug contacts 150 include crimp barrels 156 at terminating ends 158 of the plug contacts 150. The crimp barrels 156 are crimped to the cables 104. Other types of terminations may be used in alternative embodiments, such as soldering, welding, insulation displacement connections, and the like.

In an exemplary embodiment, the plug housing 110 includes a plurality of contact channels 116 that receive the plug contacts 150. In the illustrated embodiment, the plug contacts 150 are contained within the contact channels 116. For example, the mating ends 154 of the plug contacts 150 are recessed within the interior of the plug housing 110. The terminals 250 are configured to be plugged into the plug housing 110 to mate with the sockets 152. In an exemplary embodiment, the plug housing 110 includes guide features 118 to guide mating of the plug housing 110 with the header connector 200. In the illustrated embodiment, the guide features 118 are openings or grooves at the mating end 112 of the plug housing 110. Other types of guide features may be used in alternative embodiments. In an exemplary embodiment, the plug connector 102 includes a seal 120 configured to be sealed to the housing 210 when mated thereto. The seal 120 provide a sealed mating interface between the plug connector 102 and the header connector 200.

Figure 3:
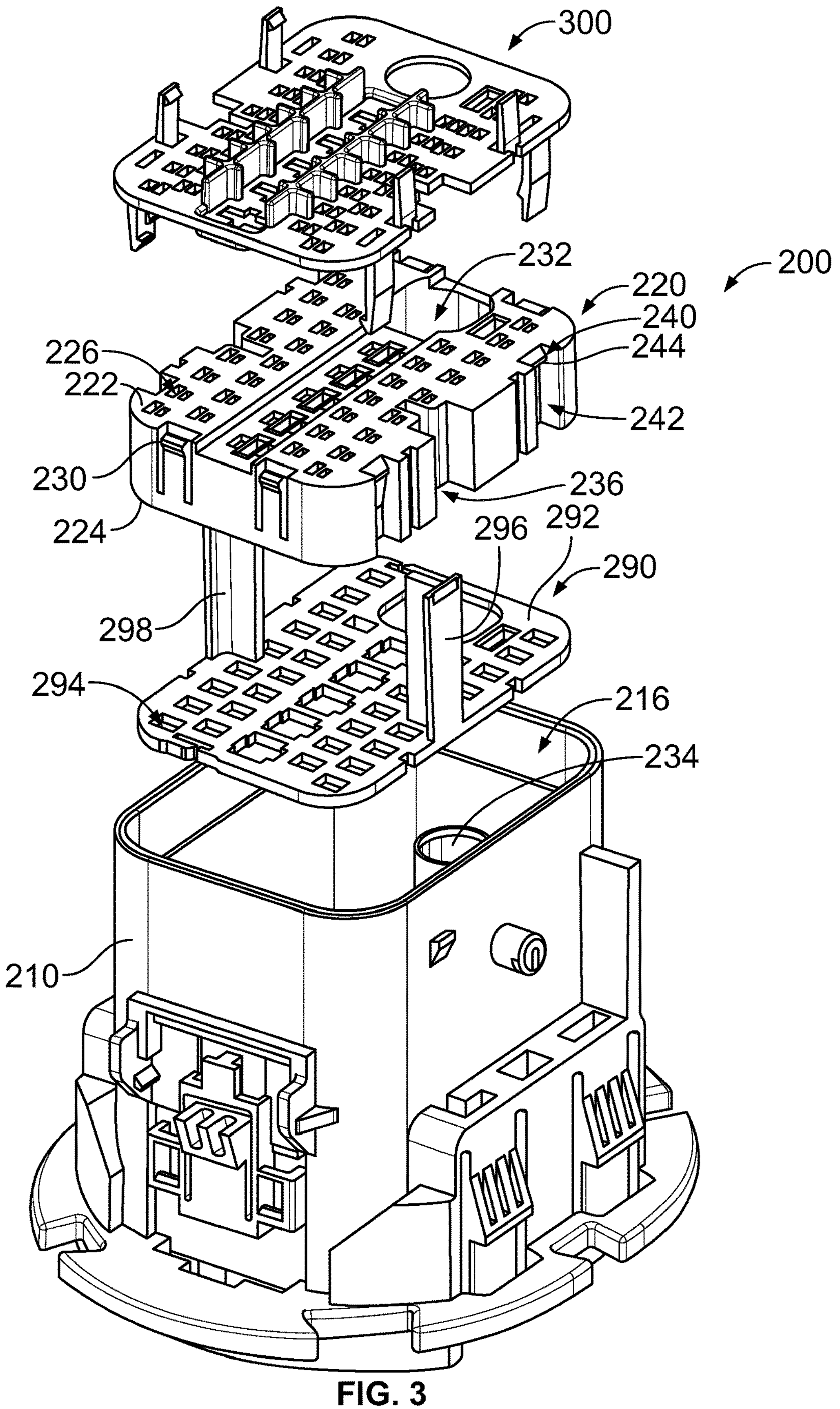
FIG. 3 is an exploded view of the header connector in accordance with an exemplary embodiment.

FIG. 3 is an exploded view of the header connector 200 in accordance with an exemplary embodiment. The header connector 200 includes the housing 210 having the cavity 216. The header connector 200 includes a terminal holder 220 used to hold the terminals 250. In an exemplary embodiment, the header connector 200 includes a terminal stabilizer 300 used to support the terminals 250, such as during assembly, transport, and a bore mating with the plug connector 102. The terminal stabilizer 300 is used to protect the terminals 250 from damage.

In various embodiments, the header connector 200 may include a guide plate 290 used to guide mating of the plug connector 102 with the header connector 200 and/or to guide movement of the terminal stabilizer 300 relative to the terminal holder 220 and/or to guide positioning of the terminal holder 220 within the housing 210.

In an exemplary embodiment, the terminal holder 220 is separate and discrete from the housing 210. For example, the terminal holder 220 may be molded during a separate molding process separate from the housing 210. However, in alternative embodiments, the terminal holder 220 may be integral with the housing 210. For example, the terminal holder 220 may be co-molded with the housing 210 during a single molding process.

The terminal holder 220 extends between an upper surface 222 and a lower surface 224. The terminal holder 220 includes a plurality of terminal channels 226 extending therethrough. The terminal channel 226 are configured to receive the corresponding terminals 250. The terminal channels 226 are open at the upper surface 222 and the lower surface 224 to allow the terminals 250 to extend from the upper surface 222 and/or the lower surface 224. In an exemplary embodiment, the terminals 250 are configured to be rear loaded into the terminal holder 220 through the lower surface 224. In the illustrated embodiment, the terminal channels 226 are arranged in rows. Optionally, the terminal holder 220 may include different sized terminal channels 226 for receiving different sized terminals 250, such as signal terminals and power terminals. In the illustrated embodiment, the terminal holder 220 includes thirty-eight terminal channels 226. However, the terminal holder 220 may include greater or fewer terminal channels 226 in alternative embodiments.

In an exemplary embodiment, the terminal holder 220 includes latches 230 along opposite ends of the terminal holder 220. The latches 230 are used to secure the terminal holder 220 to the housing 210. The latches 230 may be deflectable latches and may be released to remove the terminal holder 220 from the housing 210, such as for repair or replacement.

In an exemplary embodiment, the terminal holder 220 includes an opening 232 configured to receive a tube 234 extending from the housing 210. In the illustrated embodiment, the opening 232 is located proximate to one of the sides of the terminal holder 220.

In an exemplary embodiment, the terminal holder 220 includes guide features 236 configured to interface with the guide plate 290 to position the terminal holder 220 relative to the guide plate 290. In the illustrated embodiment, the guide features 236 are openings or slots formed in one or more sides of the terminal holder 220. Other types of guide features may be used in alternative embodiments. Optionally, one or more of the guide features 236 may be used to guide mating of the terminal holder 220 with the housing 210. For example, the guide features 236 may include grooves, slots, ribs, protrusions, or other types of features to guide mating with the housing 210.

In an exemplary embodiment, the terminal holder 220 includes a plurality of support latches 240. The support latches 240 are used to support the terminals stabilizer 300 relative to the terminal holder 220. In the illustrated embodiment, the support latches 240 are provided along opposite sides of the terminal holder 220. Optionally, each side of the terminal holder 220 may include multiple support latches 240. For example, the support latches 240 may be provided proximate to the ends, such as near the corners of the terminal holder 220. The support latches 240 may be located in the pockets 242 formed in the sides of the terminal holder 220. Each support latches 240 includes a latching element 244 extending into the pocket 242. In the illustrated embodiment, the latching element 244 is located proximate to the upper surface 222. Other locations are possible in alternative embodiments. The support latches 240 are used to hold the terminals stabilizer 300 in an elevated position to protect the mating ends of the terminals 250. The terminal stabilizer 300 may be released from the support latches 240 during mating to lower the terminal stabilizer 300 and expose the mating ends for mating with the plug contacts 150 of the plug connector 102.

In an exemplary embodiment, the guide plate 290 includes a pin plate member 292 having a plurality of openings 294. The openings 294 configured to receive the terminals 250 and/or the cables 204. The openings 294 are arranged in rows that match the rows of the terminal channels 226. In an exemplary embodiment, the guide plate 290 includes guide posts 296, 298 extending upward from the plate member 292. The guide posts 296, 298 are arranged at opposite sides of the guide plate 290. The guide posts 296, 298 are configured to be received in the guide features 236 of the terminal holder 220 to position the terminal holder 220 relative to the guide plate 290. The guide posts 296, 298 may interface with the housing 210 to position the guide plate 290 relative to the housing 210. The guide posts 296, 298 may interface with the terminal stabilizer 300 to position the terminal stabilizer 300 relative to the guide plate 290 and/or the terminal holder 220. For example, as the terminal stabilizer 300 moves between the elevated or extended position and the lowered or retracted position, the guide posts 296, 298 may guide such movement. The guide posts 296, 298 may interface with the plug connector 102 as the plug connector 102 is mated with the header connector 200 to guide mating of the plug connector 102 with the header connector 200. Other types of guide features may be used in alternative embodiments.

Figure 4:
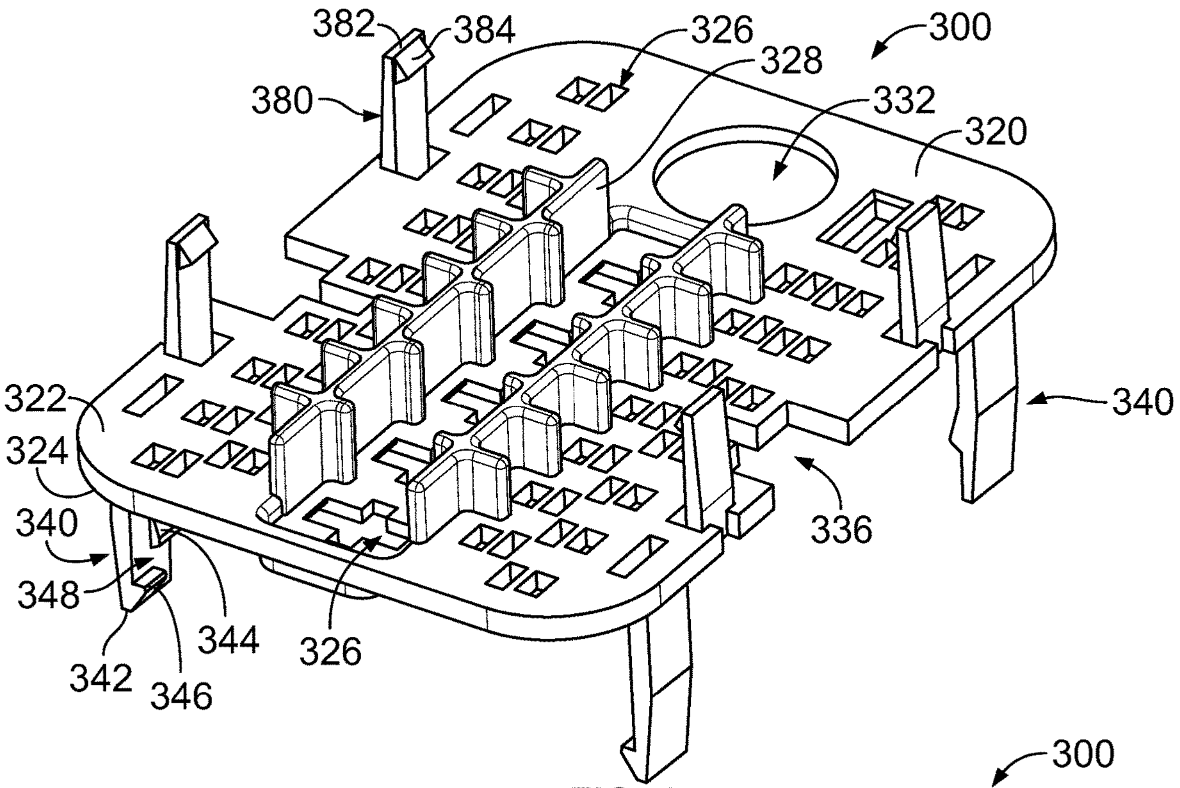
FIG. 4 is a top perspective view of the terminal stabilizer in accordance with an exemplary embodiment.
Figure 5:
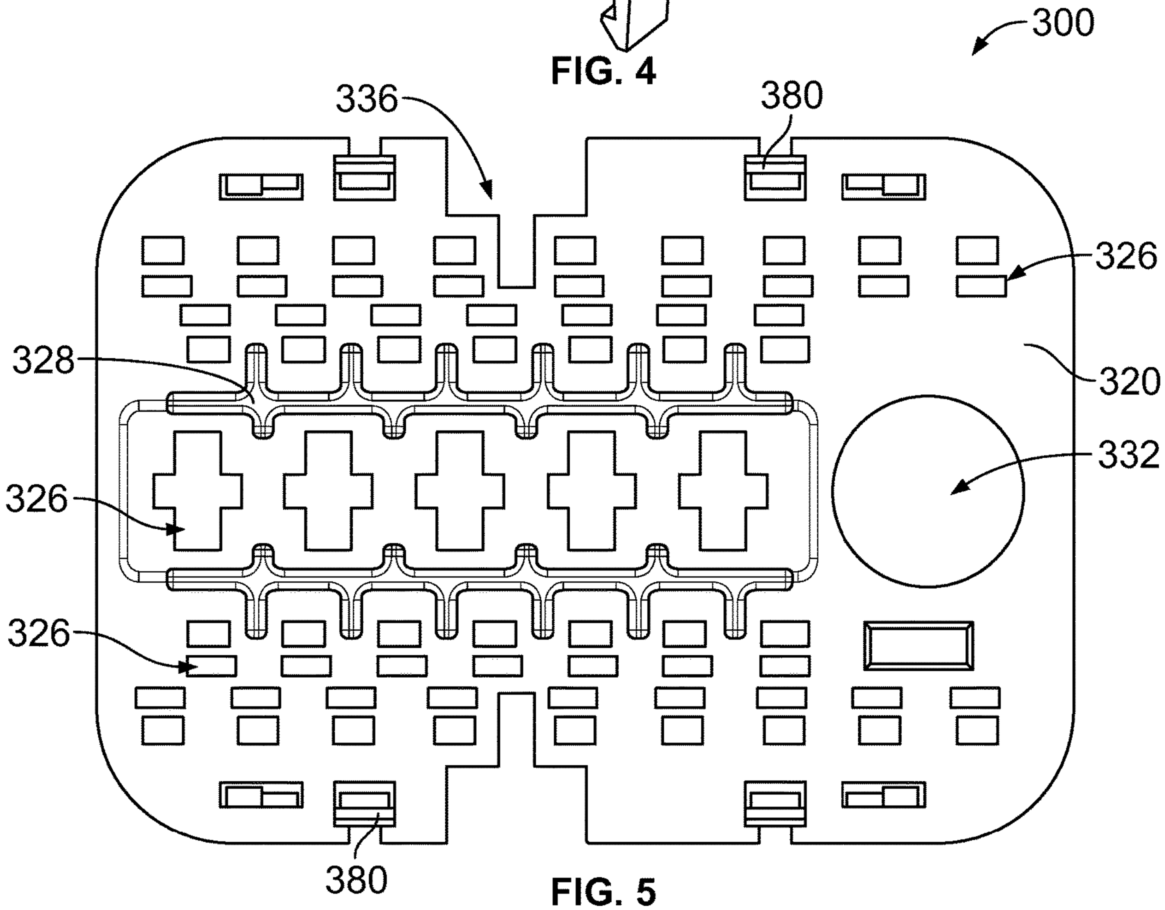
FIG. 5 is a top view of the terminal stabilizer in accordance with an exemplary embodiment.

FIG. 4 is a top perspective view of the terminal stabilizer 300 in accordance with an exemplary embodiment. FIG. 5 is a top view of the terminal stabilizer 300 in accordance with an exemplary embodiment. The terminal stabilizer 300 includes a stabilizer plate 320, locking arms 340 extending from the stabilizer plate 320, and lift arms 380 extending from the stabilizer plate 320.

In an exemplary embodiment, the terminal stabilizer 300 is manufactured from a dielectric material. The terminal stabilizer 300 may be a molded part molded from a plastic material. The locking arms 340 and the lifter arms 380 are formed integral with the stabilizer plate 320, such as being molded during a common molding process.

The stabilizer plate 320 extends between an upper surface 322 and a lower surface 324. The stabilizer plate 320 includes a plurality of terminal openings 326 extending therethrough. The terminal openings 326 are configured to receive ends of the terminals 250. The terminal openings 326 are open at the upper surface 322 and the lower surface 324 to allow the terminals 250 to extend through the stabilizer plate 320. In the illustrated embodiment, the terminal openings 326 are arranged in a plurality of rows. Optionally, the stabilizer plate 320 may include different sized terminal openings 326 for receiving different sized terminals 250, such as signal terminals and power terminals. In the illustrated embodiment, the stabilizer plate 320 includes 38 terminal openings 326. However, the stabilizer plate 320 may include greater or fewer terminal openings 326 in alternative embodiments. In various embodiments, the terminal openings 326 may be dimensioned to orient the mating ends of the terminals 250 relative to each other at particular spacing for mating with the plug connector 102. For example, the terminal openings 326 may have a width and/or a length that is generally equal to or slightly larger than the width and/or the length of the terminal 250 to control X and Y positioning of the terminals 250 relative to each other. As such, the terminal stabilizer 300 is used to organize and position the mating ends of the terminals 250 for mating with the plug connector 102.

In an exemplary embodiment, the stabilizer plate 320 includes separating walls 328 extending from the upper surface 322 and/or the lower surface 324. The separating walls 328 are arranged between various rows and/or columns of the terminal openings 326. The separating walls 328 separate the terminal openings 326 from other terminal openings. In various embodiments, the separating walls 328 may separate power contacts from signal contacts. However, in other various embodiments, the separating walls 328 may separate power contacts from other power contacts and/or may separate signal contacts from other signal contacts. Optionally, the separating walls 328 may provide electrical shielding between the various terminals 250. In various embodiments, the separating walls 328 may be used as the guide walls to guide mating of the plug connector 102 with the header connector 200. For example, the separating walls 328 may be received in slots or openings in the plug housing 110 to position the plug housing 110 relative to the stabilizer plate 320, such as to align the plug contacts 150 of the plug connector 102 with the terminals 250 during mating.

In an exemplary embodiment, the stabilizer plate 320 includes an opening 332 configured to receive the tube 234 extending from the housing 210. In the illustrated embodiment, the opening 332 is located proximate to one of the sides of the stabilizer plate 320. In the illustrated embodiment, the opening 332 is circular. However, the opening 332 may have other shapes in alternative embodiments.

In an exemplary embodiment, the stabilizer plate 320 includes guide features 336 configured to interface with the guide plate 290 (FIG. 3) to position the stabilizer plate 320 relative to the guide plate 290. In the illustrated embodiment, the guide features 336 are openings or slots formed in one or more sides of the stabilizer plate 320. Other types of guide features may be used in alternative embodiments. Optionally, one or more of the guide features 336 may be used to guide mating of the stabilizer plate 320 with the housing 210. For example, the guide features 336 may include grooves, slots, ribs, protrusions, or other types of guide features to guide mating with the housing 210. Optionally, one or more of the guide features 336 may be used to guide mating of the stabilizer plate 320 with the plug connector 102. For example, the guide features 336 may include tabs, ribs, posts, or other extensions extending from the stabilizer plate 320 to interface with the plug housing 110 during mating to align the plug contacts of the plug connector 102 with the terminal openings 326. In various embodiments, the separating walls 328 may define the guide features 336 that interface with the plug connector 102 to align the plug connector 102 with the terminal stabilizer 300.

The locking arms 340 extend downward from the lower surface 324 of the stabilizer plate 320. The locking arms 340 are used to connect the terminal stabilizer 300 to the terminal holder 220. In an exemplary embodiment, the locking arms 340 are deflectable and configured to be latchably coupled to the terminal holder 220. Each locking arm 340 extends to a distal end 342.

In an exemplary embodiment, each locking arm 340 includes an inner lock 344 and an outer lock 346. Optionally, both the inner lock 344 and the outer lock 346 face inward. For example, both the inner lock 344 and the outer lock 346 extend from the interior surface of the blocking arm 340. The inner lock 344 is located interior of the outer lock 346 along the locking arm 340, such as closer to the stabilizer plate 320. The outer lock 346 is located exterior of the inner lock 344 along the locking arm 340, such as closer to the distal end 342. A gap 348 is defined between the inner lock 344 and the outer lock 346. The gap 348 is configured to receive the support latch 240 (FIG. 3) of the terminal holder 220. The terminal stabilizer 300 includes a plurality of the locking arms 340. In the illustrated embodiment, four locking arms 340 are provided, such as with a pair of the locking arms 340 along each side of the terminal stabilizer 300. The locking arms 340 may be located proximate to the corners of the terminal stabilizer 300. Other locations are possible in alternative embodiments. Greater or fewer locking arms 340 may be provided in alternative embodiments.

The inner lock 344 is configured to engage the support latch 240 to position the terminal stabilizer 300 relative to the terminal holder 220. For example, the inner lock 344 may engage the support latch 240 to support the terminal stabilizer 300 at a predetermined position (for example, at the extended position). The inner lock 344 may be released from the support latch 240 with the terminal stabilizer 300 is pressed downward, such as during mating with the plug connector 102, to the retracted position. The outer lock 346 is configured to engage the support latch 240 to position the terminal stabilizer 300 relative to the terminal holder 220. For example, the outer lock 346 may engage the support latch 240 to prevent removal of the terminal stabilizer 300 from the terminal holder 220. The outer lock 346 may prevent upward movement of the terminal stabilizer 300 beyond a predetermined position (for example, the extended position).

The lift arms 380 extend upward from the upper surface 322 of the stabilizer plate 320. The lift arms 380 are configured to engage the plug connector 102 when the plug connector 102 is mated with the terminal stabilizer 300 of the header connector 200. The lift arms 380 are used to lift the terminal stabilizer 300 from the retracted position to the extended position when the plug connector 102 is unmated from the header connector 200. For example, when the plug connector 102 is lifted upward, the plug connector 102 lifts the terminal stabilizer 300 from the retracted position to the extended position.

In an exemplary embodiment, the lift arms 380 are deflectable and configured to be latchably coupled to the plug connector 102. Each lift arm 380 extends to a distal end 382. The lift arm 380 includes a latching feature 384 proximate to the distal end 382. The latching features 384 is configured to be latchably coupled to the plug connector 102. The latching features 384 may be released from the plug connector 102 after the terminal stabilizer 300 is lifted to the extended position to separate from the plug connector 102. The terminal stabilizer 300 includes a plurality of the lift arms 380. In the illustrated embodiment, four lift arms 380 are provided, such as with a pair of the lift arms 380 along each side of the terminal stabilizer 300. Optionally, the lift arms 380 may be staggered or offset relative to the locking arms 340, such as for ease of molding during manufacture. Other locations are possible in alternative embodiments. Greater or fewer lift arms 380 may be provided in alternative embodiments.

Figure 6:
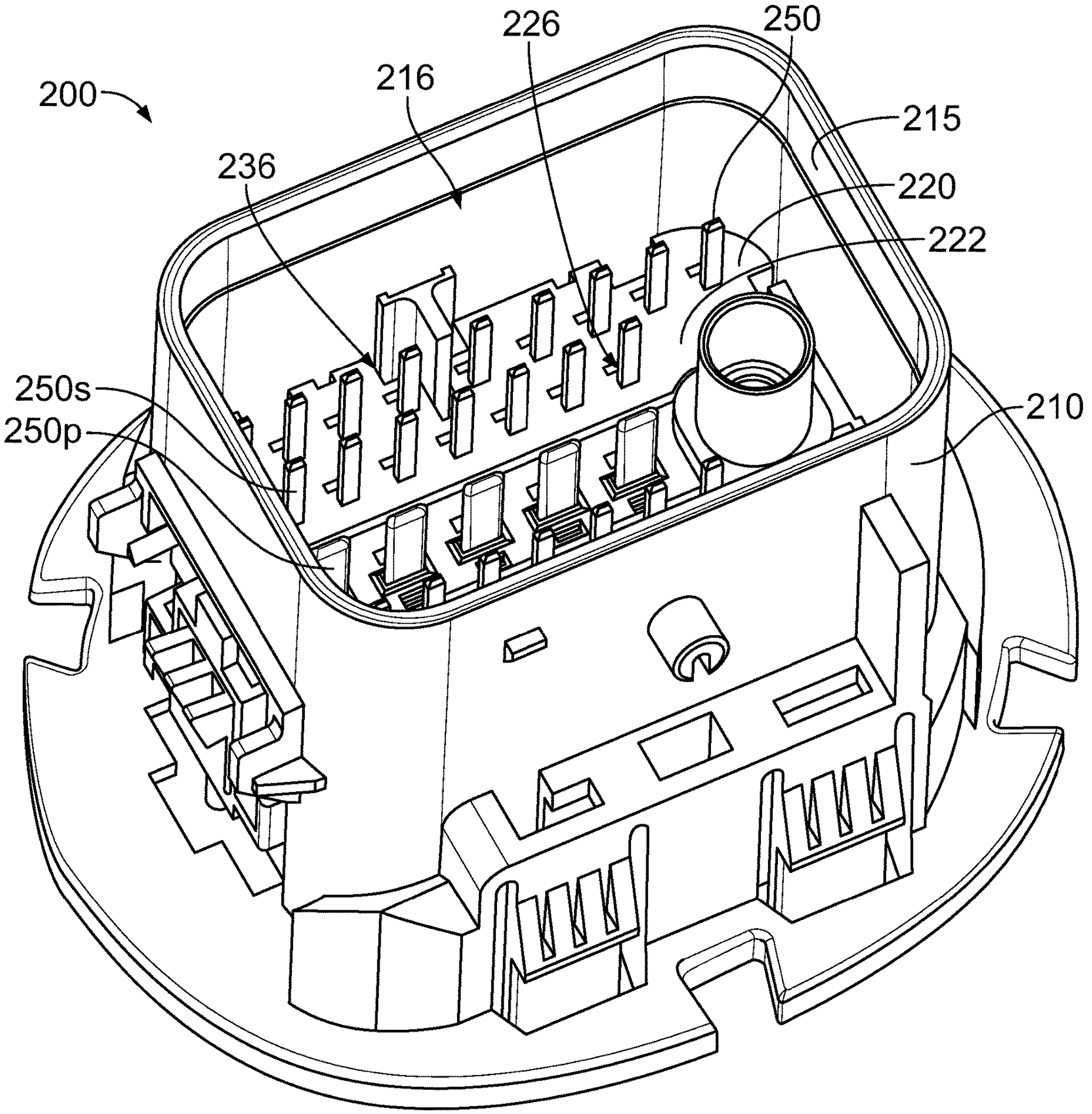
FIG. 6 is a top perspective view of a portion of the header connector in accordance with an exemplary embodiment.
Figure 7:
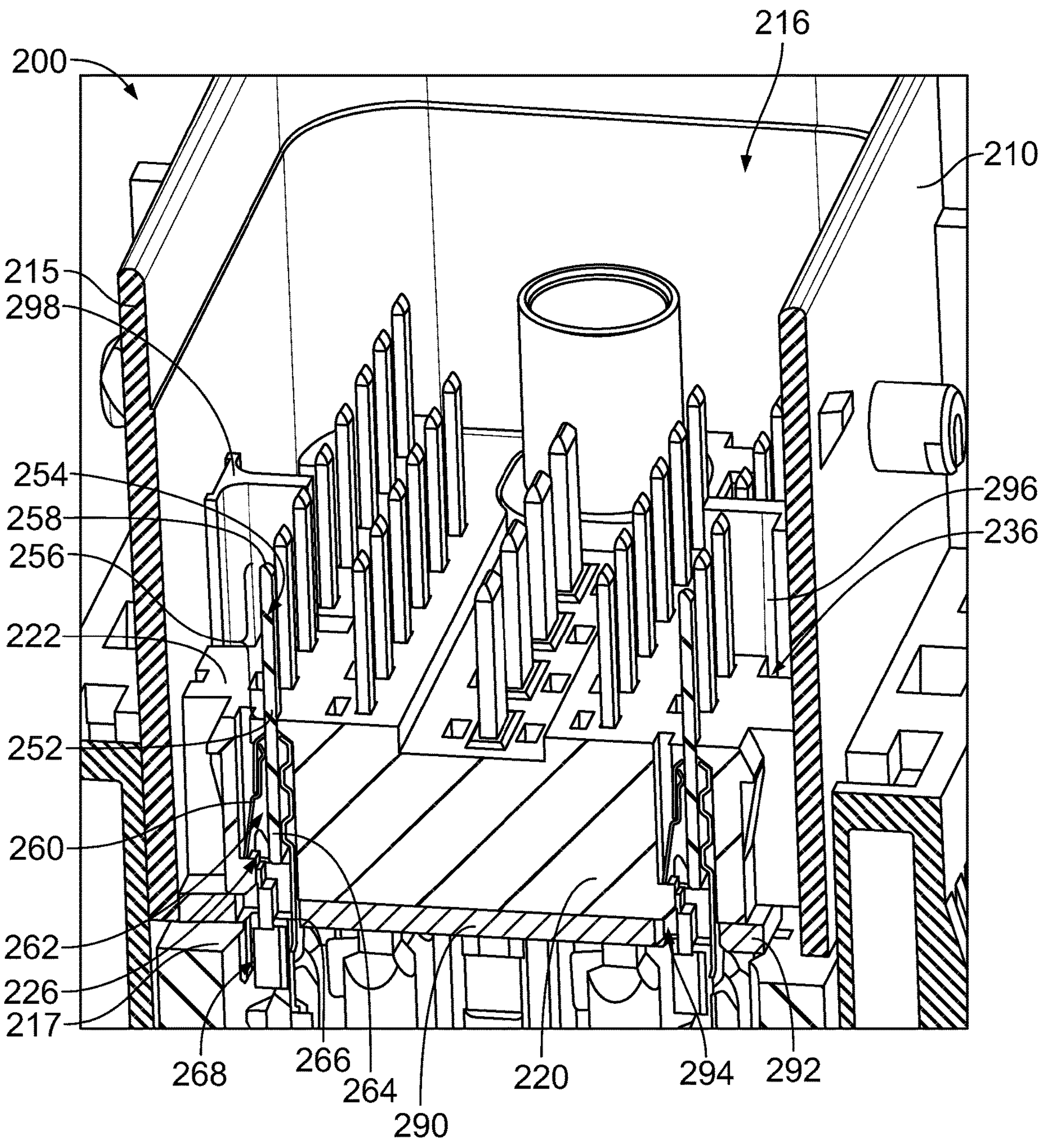
FIG. 7 is a sectional view of a portion of the header connector in accordance with an exemplary embodiment.

FIG. 6 is a top perspective view of a portion of the header connector 200 in accordance with an exemplary embodiment. FIG. 7 is a sectional view of a portion of the header connector 200 in accordance with an exemplary embodiment. FIGS. 6 and 7 illustrate the terminal holder 220 and the guide plate 290 located in the cavity 216 of the housing 210. However, the terminal stabilizer 300 (FIG. 4) is not shown in FIGS. 6 and 7.

During assembly, the guide plate 290 is loaded into the cavity 216 and is seated on a bottom wall 217 of the housing 210. The guide posts 296, 298 extend upward from the plate member 292. The terminal holder 220 is loaded into the cavity 216 and positioned in the housing 210 by the guide plate 290. For example, the guide posts 296, 298 are received in the guide features 236 to position the terminal holder 220 relative to the guide plate 290. The openings 294 in the guide plate 290 are aligned with the terminal channels 226 in the terminal holder 202. The terminals 250 pass through the bottom wall 217 into the openings 294 and the terminal channels 226. In an exemplary embodiment, the tube 234 is received in the opening 232.

In an exemplary embodiment, each terminal 250 includes a pin or blade 252 defining a male mating end 254 of the terminal 250. The male mating ends 254 of the terminals 250 are arranged in the cavity 216 of the housing 210 for mating with the plug connector 102. In an exemplary embodiment, each blade 252 has an exposed portion 256 above the upper surface 222 of the terminal holder 220 exposed in the cavity 216 for mating with the plug connector 102. The exposed portion 256 extends to a distal end 258 of the male mating ends 254. The length of the exposed portion 256 is sufficient to plug into the socket 152 of the corresponding plug contact 150 of the plug connector 102 to make an electrical connection between the terminal 250 and the plug contact 150.

The terminal 250 is electrically connected to the cable 204. In an exemplary embodiment, the terminal 250 is a multipiece terminal. For example, the blade 252 is coupled to a socket contact 260, which is terminated to the cable 204. For example, the socket contact 260 includes a socket 262 that receives a second male mating end 264 of the blade 252 opposite the first male mating end 254. The socket contact 260 includes a crimp barrel 266 at a terminating end 268 of the terminal 250. The crimp barrel 266 is crimped to the cable 204. The terminal 250 may be terminated to the cable 204 by other means in alternative embodiments, such as being soldered, welded, an insulation displacement connection, or other electrical connection. In other alternative embodiments, the terminal 250 may be a single piece terminal rather than the multipiece terminal. For example, the crimp barrel 266 and the blade 252 may be stamped and formed from a single piece of metal.

Optionally, the header connector 200 may include different types of terminals 250, such as signal terminals 250*s* and power terminals 250*p*. The power terminals 250*p* may be sized and/or shaped differently than the signal terminals 250*s*, such as being wider and/or thicker. Optionally, the distal ends of each of the terminals 250 may be co-planer. However, in alternative embodiments, one or more of the terminals 250 may be taller or shorter. In the illustrated embodiment, the power terminals 250*p* are arranged in a single row in the center of the terminal holder 220 and the signal terminals 250*s* are arranged in multiple rows on both sides of the power terminals 250*p*. Other arrangements are possible in alternative embodiments. In an exemplary embodiment, the header connector 200 may include thirty-eight terminals 250. However, the header connector 200 may include greater or fewer terminals 250 in alternative embodiments. Other types of terminals 250 may be provided in alternative embodiments, such as ground terminals.

Figure 8:
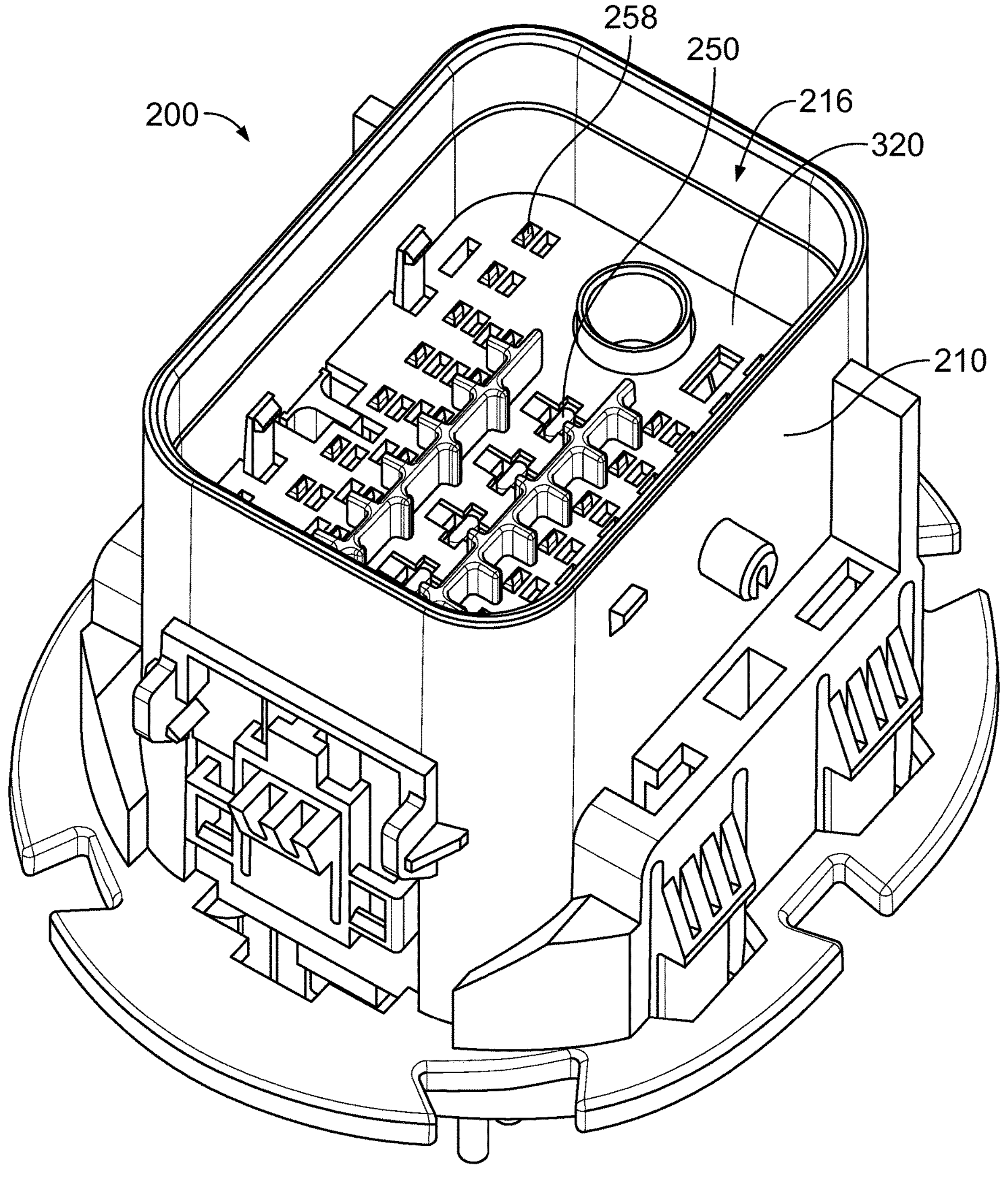
FIG. 8 is a top perspective view of a portion of the header connector in accordance with an exemplary embodiment.
Figure 9:
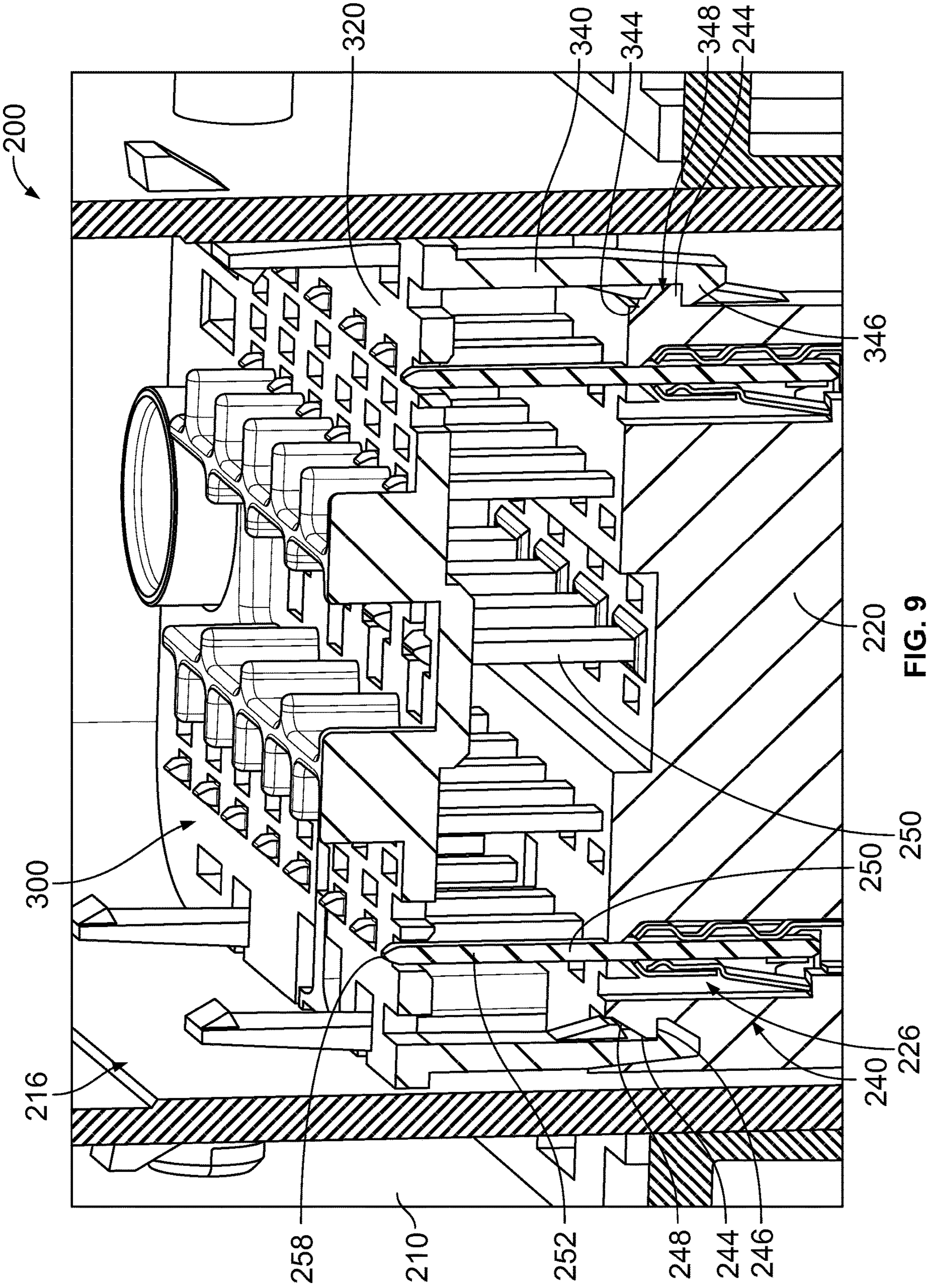
FIG. 9 is a sectional view of a portion of the header connector in accordance with an exemplary embodiment.

FIG. 8 is a top perspective view of a portion of the header connector 200 in accordance with an exemplary embodiment. FIG. 9 is a sectional view of a portion of the header connector 200 in accordance with an exemplary embodiment. FIGS. 8 and 9 illustrate the terminal stabilizer 300 located in the cavity 216 of the housing 210 supporting the ends of the terminals 250. The terminal stabilizer 300 is coupled to the terminal holder 220. The terminal stabilizer 300 is shown in the extended position in FIGS. 8 and 9.

During assembly, the terminal stabilizer 300 is located above the terminal holder 220. The locking arms 340 are coupled to the terminal holder 220. For example, the locking arms 340 are received in the pockets 242 and coupled to the support latches 240. In various embodiments, the terminal stabilizer 300 may be coupled to the terminal holder 220 prior to loading the terminals 250 into the terminal holder 220. However, in alternative embodiments, the terminal stabilizer 300 may be coupled to the terminal holder 220 after the terminals 250 are loaded into the terminal channels 226.

The terminal stabilizer 300 is movable relative to the terminal holder 220 between the extended position and the retracted position. The terminal stabilizer 300 moves along the blades 252 of the terminals 250 when the terminal stabilizer 300 moves between the extended position and the retracted position. In the extended position, the terminal stabilizer 300 supports the distal ends 258 of the terminals 250. For example, the stabilizer plate 320 is generally aligned with the distal ends 258 in the extended position. The terminal stabilizer 300 may be pressed downward to the retracted position, such as during mating with the plug connector 102.

The locking arms 340 are used to position the terminal stabilizer 300 in the extended position. The locking arms 340 engage the support latches 240 in the extended position. For example, each support latch 240 is located in the corresponding gap 348 between the inner lock 344 and the outer lock 346. The outer lock 346 is located below the latching element 244 of the support latch 240. The outer lock 346 interfaces with a catch surface 246 along a bottom side of the latching element 244 to latchably couple the blocking arm 340 to the supporting latch 240. The outer lock 346 prevents upward movement of the terminal stabilizer 300 beyond the support latches 240. The terminal stabilizer 300 is unable to be pulled further upward than the extended position when the outer lock 346 interfaces with the latching element 244 of the support latch 240.

In the extended position, the inner lock 344 is located above the latching element 244 of the support latch 240. The inner lock 344 rests on the latching element 244 to support the terminal stabilizer 300 in the extended position. The support latch 240 supports the weight of the terminal stabilizer 300 to hold the terminal stabilizer 300 in the elevated or extended position. However, if sufficient force is applied to the terminal stabilizer 300, the terminal stabilizer 300 may be pressed downward to the retracted position. For example, the locking arm 340 may be released from the support latch 240 to move the terminal stabilizer 300 to the retracted position. In an exemplary embodiment, the latching element 244 includes a ramp surface 248 along the upper side of the latching element 244. The inner lock 344 is seated on the ramp surface 248. When the terminal stabilizer 300 is pressed downward, the inner lock 344 rides along the ramp surface 248 and the locking arm 340 is deflected outward to release from the support latch 240.

Figure 10:
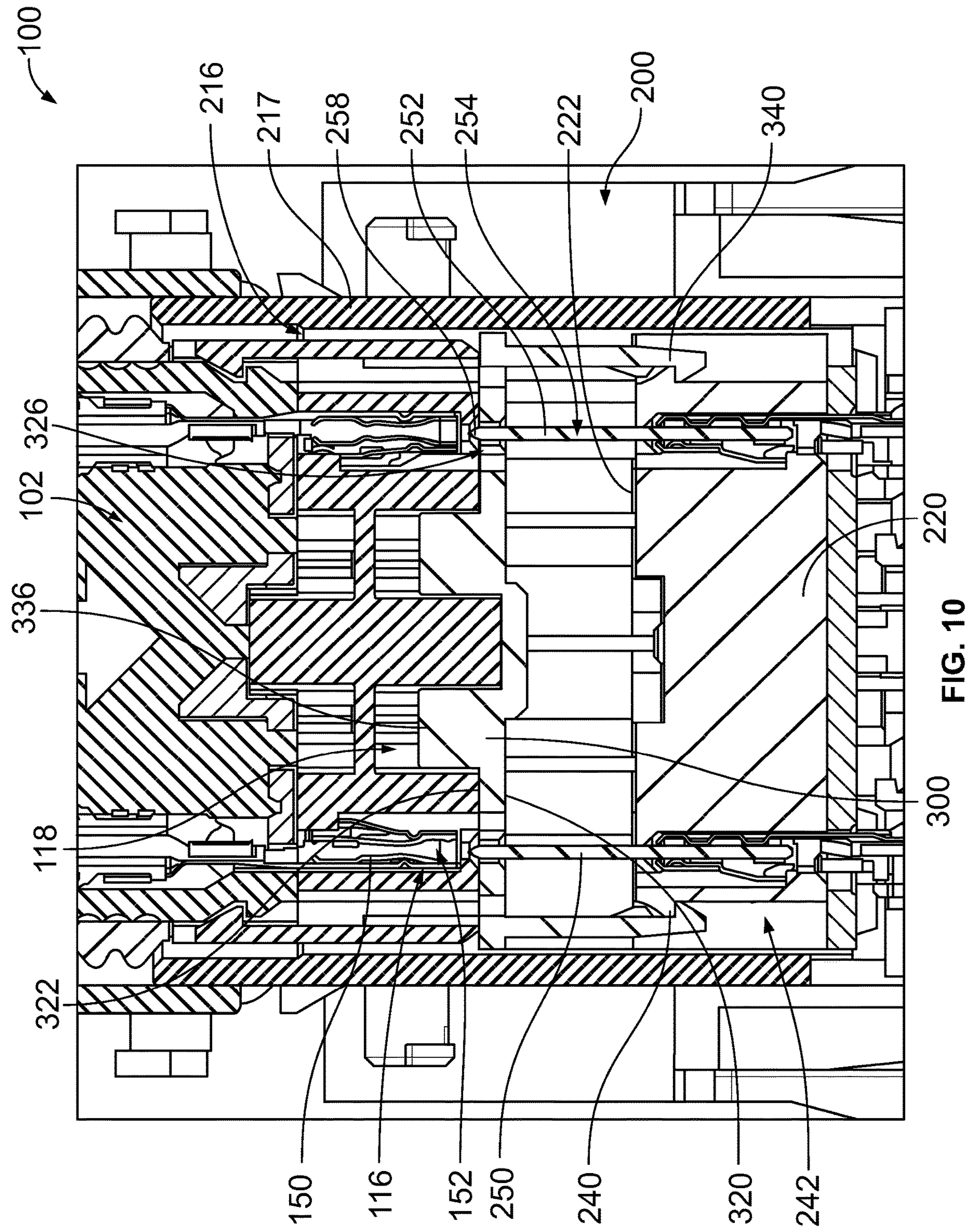
FIG. 10 is a cross-sectional view of a portion of the electrical connector system in accordance with an exemplary embodiment showing the plug connector initially mated with the header connector.
Figure 11:
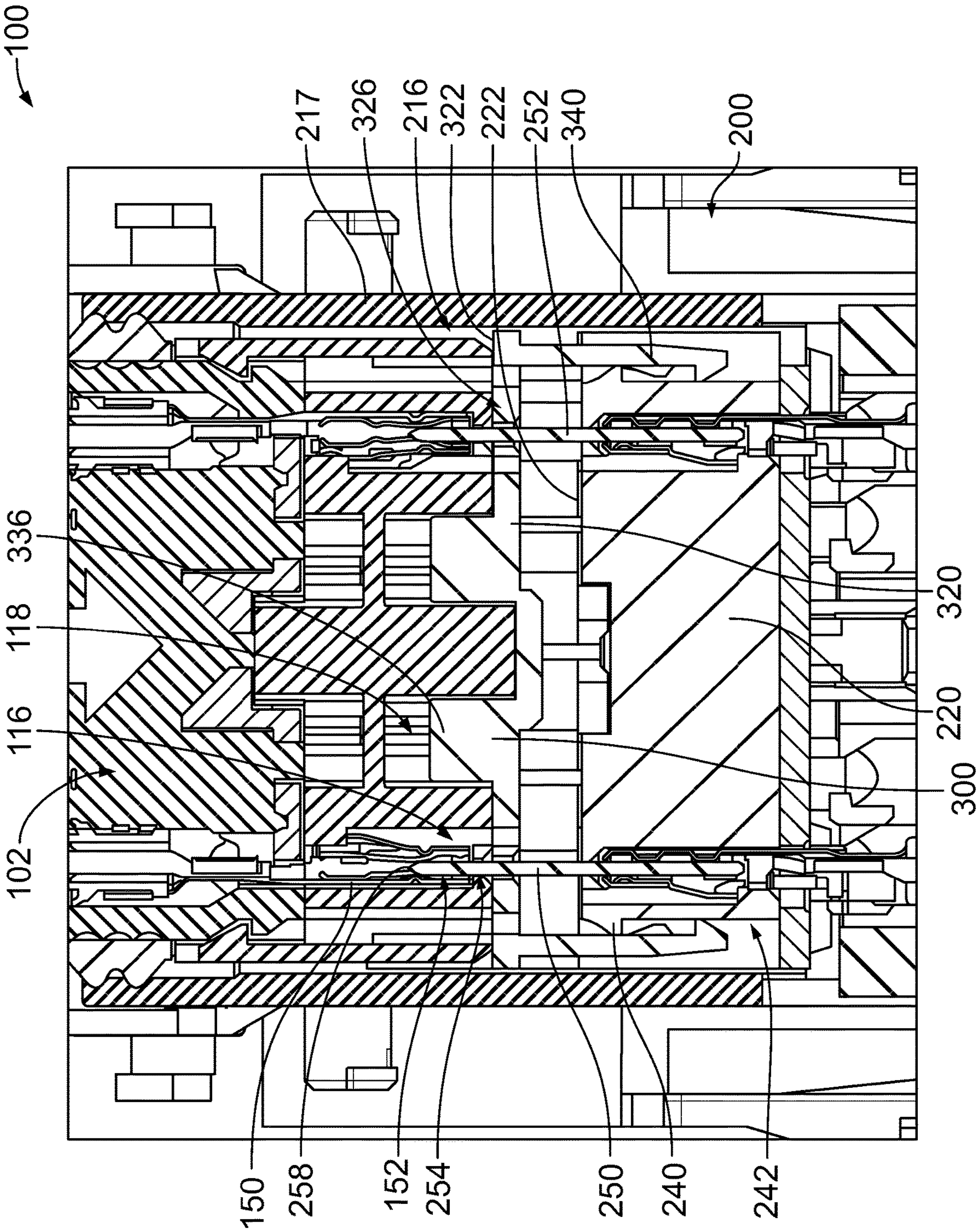
FIG. 11 is a cross-sectional view of a portion of the electrical connector system in accordance with an exemplary embodiment showing the plug connector partially mated with the header connector.
Figure 12:
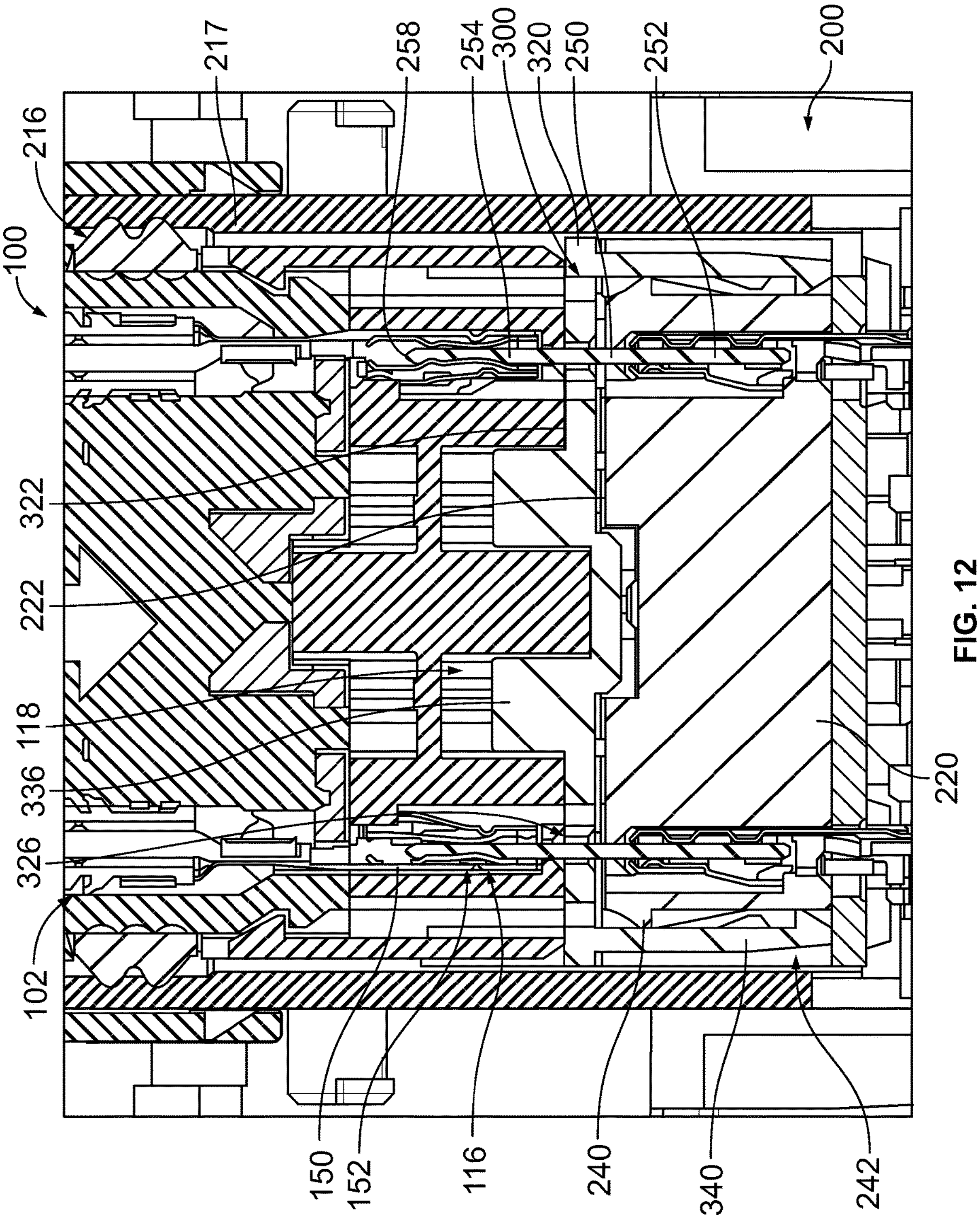
FIG. 12 is a cross-sectional view of a portion of the electrical connector system in accordance with an exemplary embodiment showing the plug connector fully mated with the header connector.

FIG. 10 is a cross-sectional view of a portion of the electrical connector system 100 in accordance with an exemplary embodiment showing the plug connector 102 initially mated with the header connector 200. FIG. 11 is a cross-sectional view of a portion of the electrical connector system 100 in accordance with an exemplary embodiment showing the plug connector 102 partially mated with the header connector 200. FIG. 12 is a cross-sectional view of a portion of the electrical connector system 100 in accordance with an exemplary embodiment showing the plug connector 102 fully mated with the header connector 200.

During mating, the plug connector 102 is initially (FIG. 10) loaded into the top end of the cavity 216. The outer wall 215 generally locates the plug connector 102 in the cavity 216. The plug connector 102 is loaded into the cavity 216 to initially interface with the terminal stabilizer 300. The guide features 336 of the terminal stabilizer 300 may interface with the guide features 118 of the plug connector 102 to align the plug connector 102 with the terminals 250 of the header connector 200. In an exemplary embodiment, the terminal stabilizer 300 is in the extended position prior to mating to support the male mating ends 254 of the terminals 250. The terminal stabilizer 300 protects the male mating ends 254 of the terminals 250, such as by preventing bending of the terminals 250 due to misalignment with the plug connector 102 during mating. In an exemplary embodiment, the stabilizer plate 320 is generally aligned with the distal ends 258 of the terminals 250. Optionally, just the tips of the blades 252 may be exposed above the upper surface 322 of the stabilizer plate 320. These stabilizer plate 320 orients the blades 252 at proper mating locations, which correspond to the locations of the sockets 152 of the plug contacts 150. For example, the terminal openings 326 are aligned with the contact channels 116 holding the plug contacts 150.

Prior to mating the plug connector 102 with the header connector 200, the locking arms 340 of the terminal stabilizer 300 hold the terminal stabilizer 300 in the extended position. The locking arms 340 engage the support latches 240 to hold the terminal stabilizer 300 and the elevated or extended position. Once the plug connector 102 makes contact with the terminal stabilizer 300, the downward forces from loading the plug connector 102 into the header connector 200 presses the terminal stabilizer 300 in a downward direction to the partially mated position (FIG. 11). The stabilizer plate 320 is moved downward toward the terminal holder 220. Portions of the male mating ends 254 are loaded into the contact channels 116 to mate with the plug contacts 150. The locking arms 340 are released from the support latches 240 as the locking arms 340 are loaded into the pockets 242. In the fully mated position (FIG. 12), the terminal stabilizer 300 is in the retracted position. The male mating ends 254 of the terminals 250 are received in the socket 152 and electrically connected to the plug contacts 150. The stabilizer plate 320 is located at the upper surface 222 of the terminal holder 220.

Figure 13:
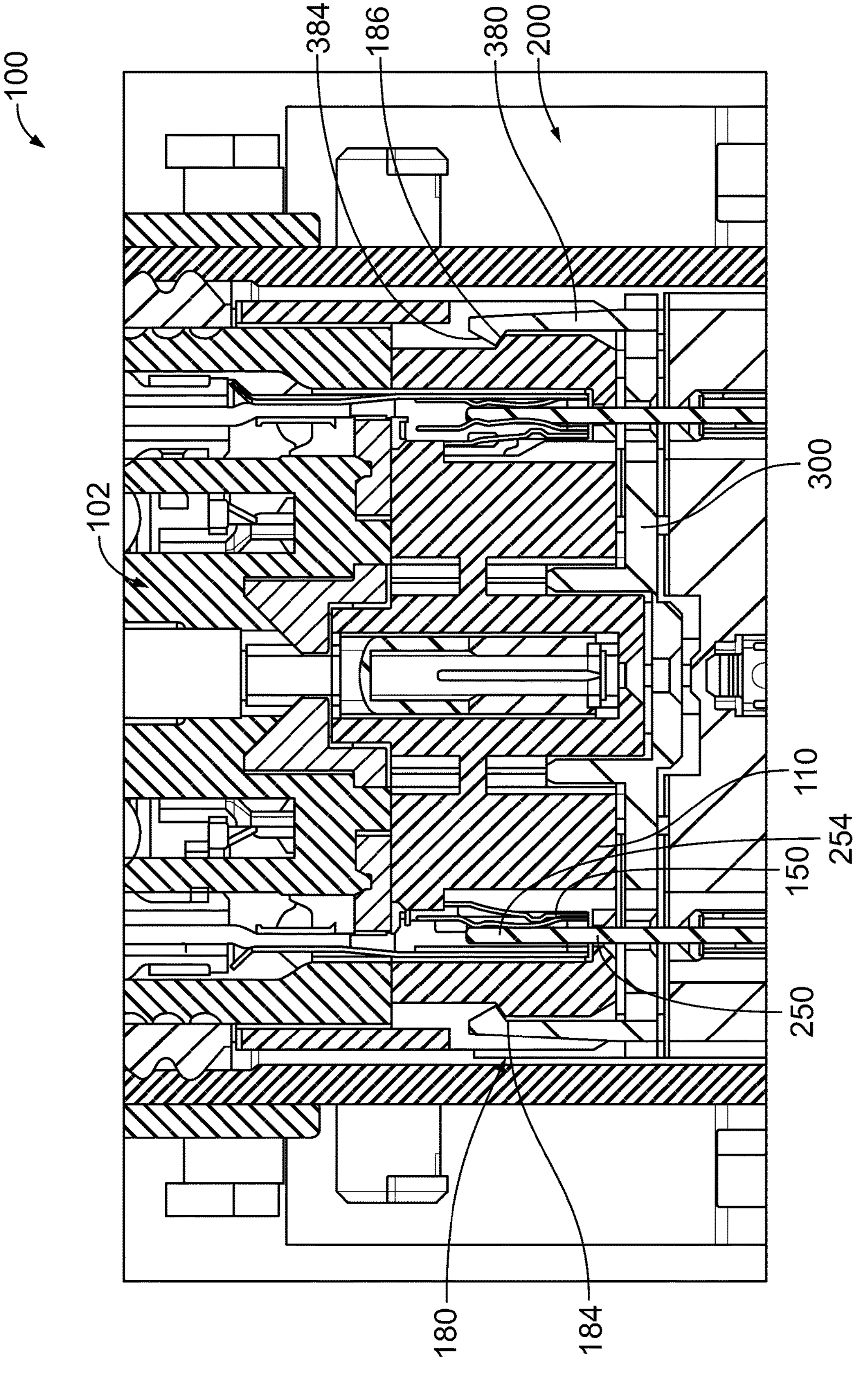
FIG. 13 is a cross-sectional view of a portion of the electrical connector system in accordance with an exemplary embodiment showing the plug connector fully mated with the header connector.
Figure 14:
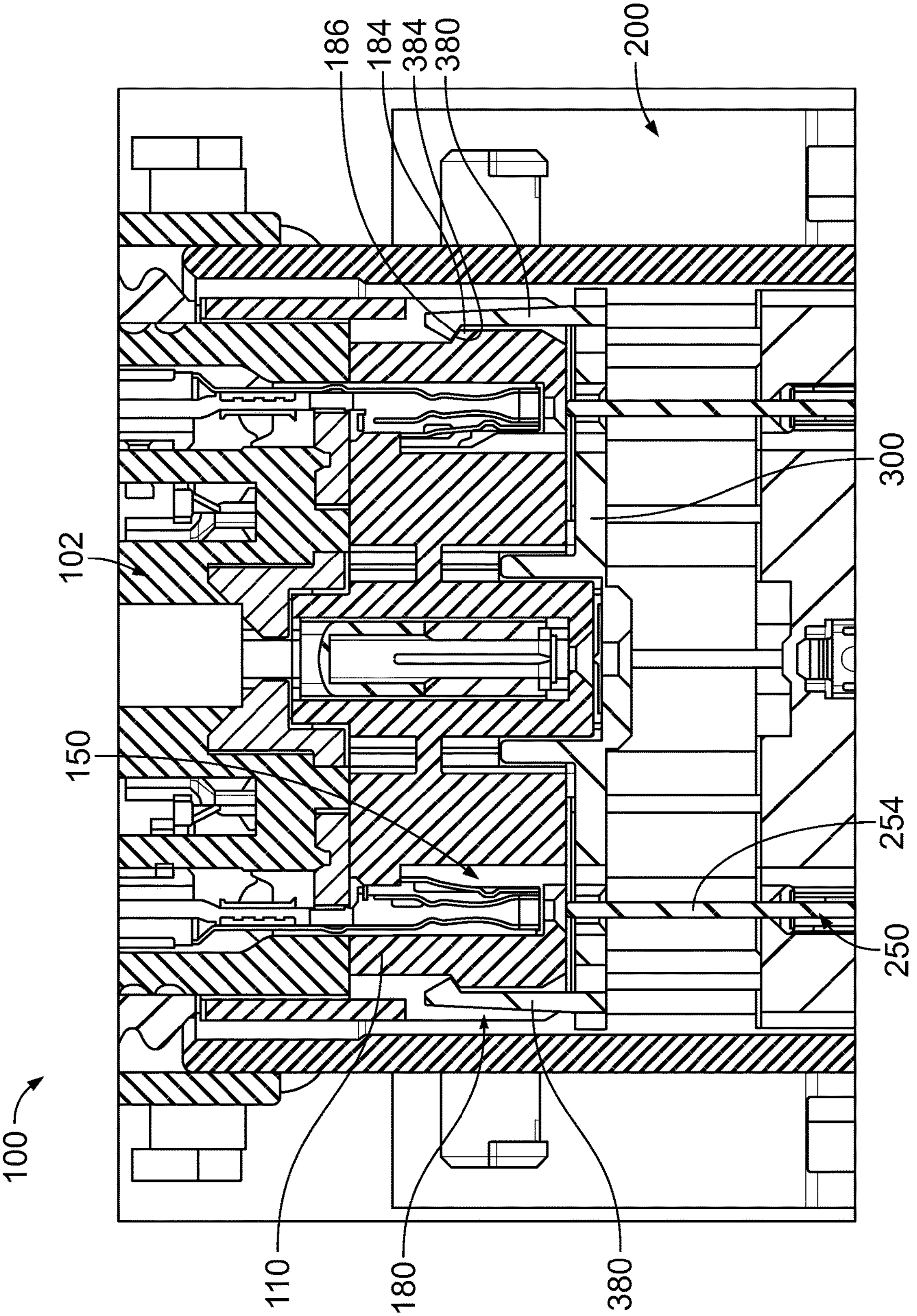
FIG. 14 is a cross-sectional view of a portion of the electrical connector system in accordance with an exemplary embodiment showing the plug connector partially unmated from the header connector.
Figure 15:
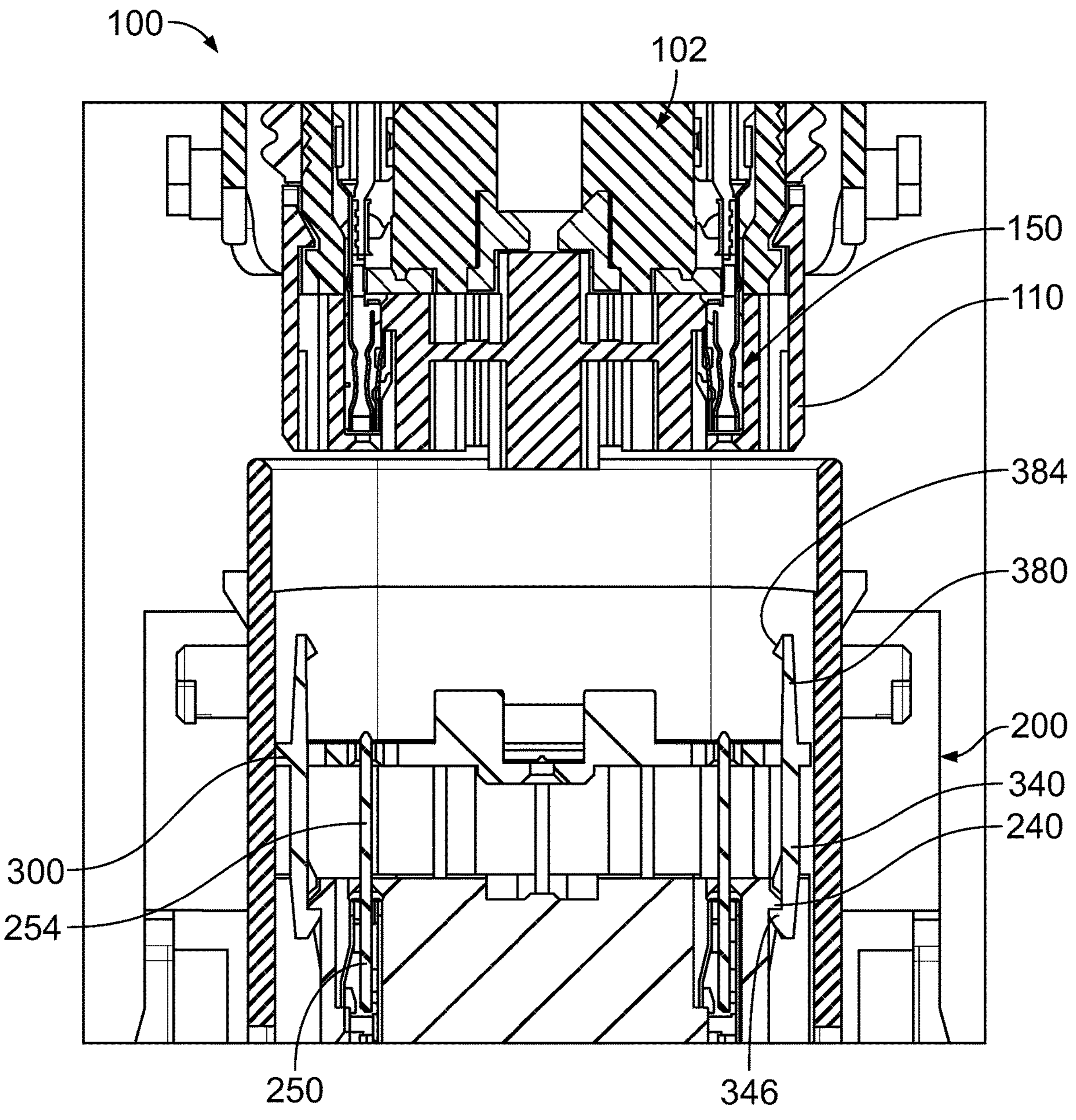
FIG. 15 is a cross-sectional view of a portion of the electrical connector system in accordance with an exemplary embodiment showing the plug connector fully unmated from the header connector.

FIG. 13 is a cross-sectional view of a portion of the electrical connector system 100 in accordance with an exemplary embodiment showing the plug connector 102 fully mated with the header connector 200. FIG. 14 is a cross-sectional view of a portion of the electrical connector system 100 in accordance with an exemplary embodiment showing the plug connector 102 partially unmated from the header connector 200. FIG. 15 is a cross-sectional view of a portion of the electrical connector system 100 in accordance with an exemplary embodiment showing the plug connector 102 fully unmated from the header connector 200. FIGS. 13-15 illustrate the lift arms 380 of the terminal stabilizer 300.

When the plug connector 102 is coupled to the header connector 200, the lift arms 380 engage the plug housing 110. For example, the plug housing 110 includes lift are pockets 180 that receive the lift arms 380. The plug housing 110 includes latching features 184 in the left arm pockets 180. The latching features 384 of the lift arms 380 interface with the latching features 184 of the plug housing 110. For example, each latching features 384 includes a catch surface 186. The latching features 384 is latched onto the catch surface 186. During mating, when the plug connector 102 is lifted upward to uncouple from the header connector 200, the upward movement of the plug connector 102 pulls the terminal stabilizer 300 in an upward direction from the retracted position (FIG. 13) to the extended position (FIG. 14). As such, the terminal stabilizer 300 is automatically returned to the extended position by the plug connector 102 when the plug connector 102 is unmated from the header connector 200. The terminal stabilizer 300 is moved upward until the locking arms 340 engage the support latches 240. When the outer lock 346 it's the latching element 244 of the support latch 240 the terminal stabilizer 300 stops moving upward. Further uncoupling of the plug connector 102 from the header connector 200 does not move the terminal stabilizer 300. The plug connector 102 separate from the terminal stabilizer 300 as the plug contacts 150 are unmated from the terminals 250. The terminal stabilizer 300 is again positioned in a supporting position to support the male mating ends 254 of the terminals 250 and prevent damage to the terminals 250.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A header connector comprising:

a housing having a cavity configured to receive a plug connector;

a terminal holder in the cavity, the terminal holder including terminal channels extending between an upper surface and a lower surface, the terminal holder including support latches;

terminals received in the terminal channels and held by the terminal holder, the terminals including male mating ends extending from the upper surface of the terminal holder into the cavity for mating with the plug connector; and a terminal stabilizer received in the cavity and coupled to the terminal holder, the terminal stabilizer including a stabilizer plate and locking arms extending from the stabilizer plate, the stabilizer plate including terminal openings therethrough that receive the male mating ends of the terminals, the terminal stabilizer being movable within the cavity relative to the terminal holder between an extended position and a retracted position, the locking arms engaging the support latches to hold the terminal stabilizer in the extended position, the locking arms being released from the support latches to move the terminal stabilizer to the retracted position;

wherein the stabilizer plate is located proximate to distal ends of the male mating ends of the terminals in the extended position and wherein the stabilizer plate is located remote from the distal ends of the male mating ends of the terminals in the retracted position.

2. The header connector of claim 1, wherein the stabilizer plate is oriented parallel to the upper surface of the terminal holder, the stabilizer plate being movable toward the upper surface as the terminal stabilizer moves from the extended position to the retracted position, the stabilizer plate being movable away from the upper surface as the terminal stabilizer moves from the retracted position to the extended position.

3. The header connector of claim 1, wherein the male mating ends have a length between the upper surface of the terminal holder and distal ends of the male mating ends, the length of the male mating ends exposed above the terminal stabilizer increase as the terminal stabilizer is moved from the extended position to the retracted position.

4. The header connector of claim 1, wherein each locking arm includes an inner lock and an outer lock positioned closer to a distal end of the locking arm than the inner lock, the outer locks interfacing with the corresponding support latches to prevent separation of the terminal stabilizer from the terminal holder, the inner locks interfacing with the corresponding support latches to hold the terminal stabilizer at the extended position relative to the terminal holder, the inner locks being released from the support latches to move the terminal stabilizer to the retracted position.

5. The header connector of claim 4, wherein a gap is provided between the inner locks and the outer locks, the terminal stabilizer being positioned in the gap in the extended position.

6. The header connector of claim 1, wherein the locking arms are deflectable to release from the support latches to allow the terminal stabilizer to move from the extended position to the retracted position.

7. The header connector of claim 1, wherein the locking arms are latchably coupled to the support latches in the extended position.

8. The header connector of claim 1, wherein the locking arms extend from a bottom of the stabilizer plate, the terminal stabilizer further including lifter arms extending from a top of the stabilizer plate, the lifter arms being configured to engage the plug connector and moved with the plug connector relative to the housing to move the terminal stabilizer from the retracted position to the extended position when the plug connector is removed from the cavity.

9. The header connector of claim 8, wherein the lifter arms are configured to separate from the plug connector when the locking arms engage the support latches in the extended position.

10. The header connector of claim 8, wherein the lifter arms are configured to be latchably coupled to the plug connector.

11. The header connector of claim 8, wherein the lifter arms are configured to engage the plug connector when the plug connector is loaded into the cavity and pressed against the stabilizer plate to move the stabilizer plate from the extended position to the retracted position.

12. A header connector comprising:

a housing having a cavity configured to receive a plug connector;

a terminal holder in the cavity, the terminal holder including terminal channels extending between an upper surface and a lower surface, the terminal holder including support latches;

terminals received in the terminal channels and held by the terminal holder, the terminals including male mating ends extending from the upper surface of the terminal holder into the cavity for mating with the plug connector; and a terminal stabilizer received in the cavity and coupled to the terminal holder, the terminal stabilizer including a stabilizer plate, locking arms extending from a bottom of the stabilizer plate, and lifter arms extending from a top of the stabilizer plate, the stabilizer plate including terminal openings therethrough that receive the male mating ends of the terminals, the terminal stabilizer being movable within the cavity relative to the terminal holder between an extended position and a retracted position, the locking arms engaging the support latches to hold the terminal stabilizer in the extended position, the locking arms being released from the support latches to move the terminal stabilizer to the retracted position, the lifter arms configured to engage the plug connector to move the terminal stabilizer from the retracted position to the extended position when the plug connector is removed from the cavity, wherein the stabilizer plate is located proximate to distal ends of the male mating ends of the terminals in the extended position and wherein the stabilizer plate is located remote from the distal ends of the male mating ends of the terminals in the retracted position.

13. The header connector of claim 12, wherein the lifter arms are configured to separate from the plug connector when the locking arms engage the support latches in the extended position.

14. The header connector of claim 12, wherein the lifter arms are configured to be latchably coupled to the plug connector.

15. The header connector of claim 12, wherein the lifter arms are configured to engage the plug connector when the plug connector is loaded into the cavity and pressed against the stabilizer plate to move the stabilizer plate from the extended position to the retracted position.

16. The header connector of claim 12, wherein each locking arm includes an inner lock and an outer lock positioned closer to a distal end of the blocking arm than the inner lock, the outer locks interfacing with the corresponding support latches to prevent separation of the terminal stabilizer from the terminal holder, the inner locks interfacing with the corresponding support latches to hold the terminal stabilizer at the extended position relative to the terminal holder, the inner locks being released from the support latches to move the terminal stabilizer to the retracted position.

17. An electrical connector system comprising:

a plug connector having a plug housing holding contacts, the plug connector having a mating end, the contacts having sockets at the mating end; and a header connector mated to the plug connector, the header connector comprising:

a housing having a cavity configured to receive the mating end of the plug housing;

a terminal holder in the cavity, the terminal holder including terminal channels extending between an upper surface and a lower surface, the terminal holder including support latches;

terminals received in the terminal channels and held by the terminal holder, the terminals including male mating ends extending from the upper surface of the terminal holder into the cavity for mating with the sockets of the contacts of the plug connector; and a terminal stabilizer received in the cavity and coupled to the terminal holder, the terminal stabilizer including a stabilizer plate and locking arms extending from a bottom of the stabilizer plate, the stabilizer plate including terminal openings therethrough that receive the male mating ends of the terminals, the terminal stabilizer being movable within the cavity relative to the terminal holder between an extended position and a retracted position, the locking arms engaging the support latches to hold the terminal stabilizer in the extended position, the locking arms being released from the support latches to move the terminal stabilizer to the retracted position, wherein the stabilizer plate is located proximate to distal ends of the male mating ends of the terminals in the extended position and wherein the stabilizer plate is located remote from the distal ends of the male mating ends of the terminals in the retracted position.

18. The electrical connector system of claim 17, wherein each locking arm includes an inner lock and an outer lock positioned closer to a distal end of the blocking arm than the inner lock, the outer locks interfacing with the corresponding support latches to prevent separation of the terminal stabilizer from the terminal holder, the inner locks interfacing with the corresponding support latches to hold the terminal stabilizer at the extended position relative to the terminal holder, the inner locks being released from the support latches to move the terminal stabilizer to the retracted position.

19. The electrical connector system of claim 17, wherein the locking arms extend from a bottom of the stabilizer plate, the terminal stabilizer further including lifter arms extending from a top of the stabilizer plate, the lifter arms being configured to engage the plug connector and moved with the plug connector relative to the housing to move the terminal stabilizer from the retracted position to the extended position when the plug connector is removed from the cavity.

20. The electrical connector system of claim 19, wherein the lifter arms are configured to be latchably coupled to the plug connector when the plug connector is loaded into the cavity and presses against the terminal holder, the lifter arms are configured to separate from the plug connector when the plug connector lifts the terminal stabilizer to the extended position and the locking arms engage the support latches.

* * * * *